United States Patent [19]
Land

[11] Patent Number: 5,932,073
[45] Date of Patent: Aug. 3, 1999

[54] DISTILLATION APPARATUS

[76] Inventor: Glenn E. Land, New River Mountain Estates, Rte. 2 Box 338, Independence, Va. 24348

[21] Appl. No.: 08/649,013

[22] Filed: May 16, 1996

[51] Int. Cl.[6] .............................. B01D 3/42; C02F 1/04
[52] U.S. Cl. .................. 202/185.3; 159/DIG. 41; 202/83; 202/181; 202/188; 202/206; 202/237; 202/242; 203/1; 203/10
[58] Field of Search ............................ 202/83, 245, 251, 202/188, 189, 237, 242, 185.3, 181, 206, 269; 159/DIG. 41; 203/10, 1; 165/133, 146, 147, 110; 137/565

[56] References Cited

U.S. PATENT DOCUMENTS

| | | | |
|---|---|---|---|
| 364,199 | 5/1887 | Coyle | 202/188 |
| 473,164 | 4/1892 | Rochlitz | 202/188 |
| 818,831 | 4/1906 | Kleitz | 202/188 |
| 861,485 | 7/1907 | Stokes | 202/188 |
| 978,443 | 12/1910 | Fleming | 202/185.4 |
| 999,793 | 8/1911 | Jewell | 202/188 |
| 1,762,898 | 6/1930 | Sorensen | 202/188 |
| 2,614,816 | 10/1952 | Hull | 202/185.3 |
| 3,340,157 | 9/1967 | Weiss . | |
| 3,507,753 | 4/1970 | Jacuzzi . | |
| 3,935,077 | 1/1976 | Dennison . | |
| 3,980,526 | 9/1976 | Kirschmann . | |
| 4,052,267 | 10/1977 | McFee . | |
| 4,081,331 | 3/1978 | Weiss . | |
| 4,089,750 | 5/1978 | Kirschmann et al. . | |
| 4,187,150 | 2/1980 | Rich . | |
| 4,216,819 | 8/1980 | Notaro | 165/133 |
| 4,247,369 | 1/1981 | Bean | 203/10 |
| 4,339,307 | 7/1982 | Ellis, Jr. . | |
| 4,861,435 | 8/1989 | Sweet, Jr. . | |
| 4,882,012 | 11/1989 | Wasserman . | |
| 4,894,123 | 1/1990 | Helmich | 202/176 |
| 4,917,770 | 4/1990 | Asbury et al. . | |
| 4,943,353 | 7/1990 | Shannon . | |
| 5,053,111 | 10/1991 | Ellerbe, Jr. . | |
| 5,178,734 | 1/1993 | Palmer . | |
| 5,203,970 | 4/1993 | Ellis, Jr. . | |
| 5,266,170 | 11/1993 | Weber et al. . | |
| 5,286,350 | 2/1994 | Huang . | |
| 5,368,698 | 11/1994 | Field et al. . | |
| 5,482,112 | 1/1996 | Sasaki et al. | 165/110 |
| 5,492,602 | 2/1996 | Vogelman et al. | 203/10 |

FOREIGN PATENT DOCUMENTS

| | | | |
|---|---|---|---|
| 1169908 | 9/1958 | France | 202/188 |
| 2502969 | 10/1982 | France | 202/185.3 |

*Primary Examiner*—Virginia Manoharan
*Attorney, Agent, or Firm*—Jones, Tullar & Cooper PC

[57] ABSTRACT

A water distiller incorporates a removable vessel for containing water, a heat source disposed below the removable vessel for heating the water to produce steam, a condenser for condensing the steam into distilled water, and an outlet from the condenser for directing distilled water into a collection container.

30 Claims, 7 Drawing Sheets

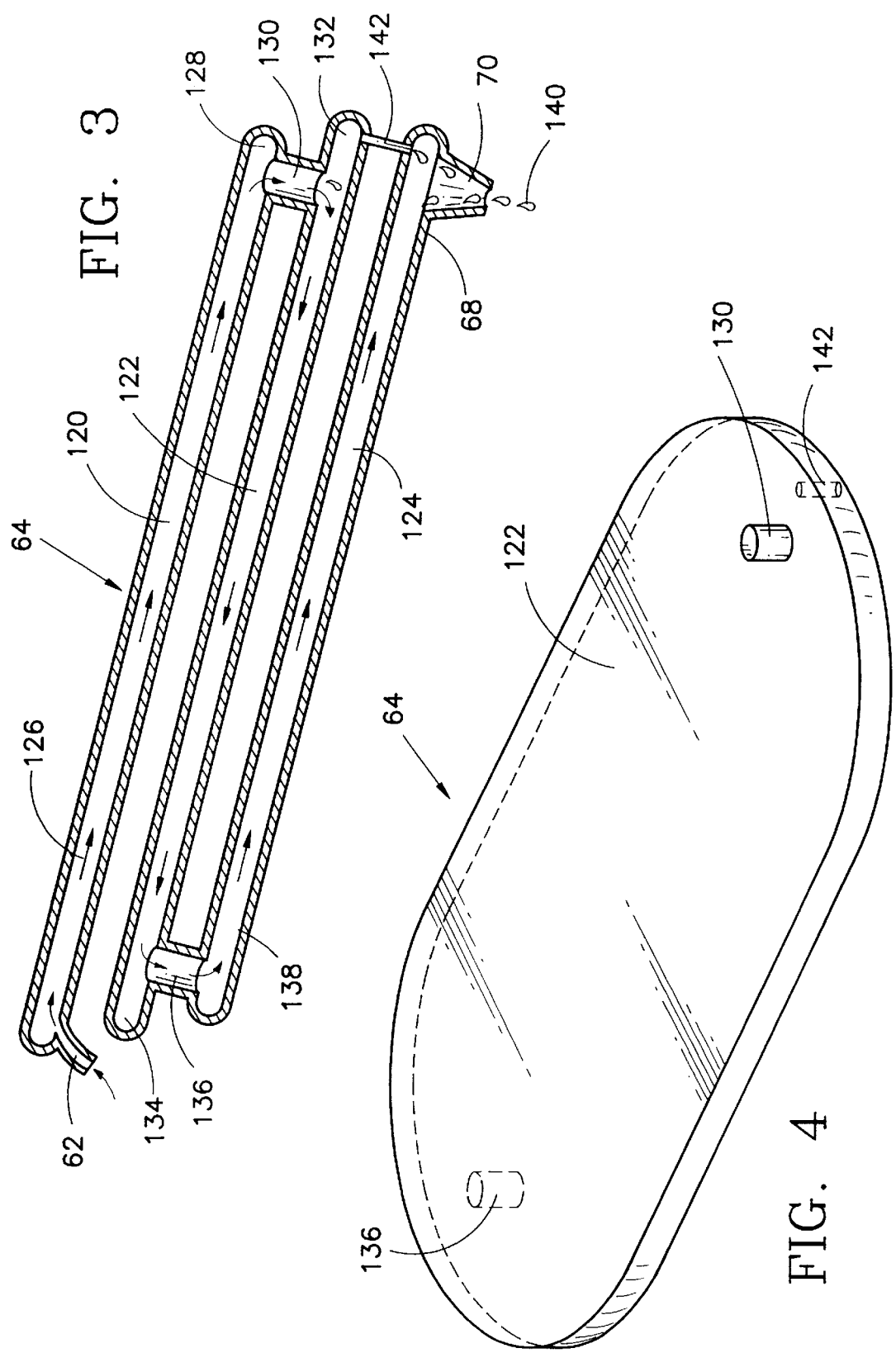

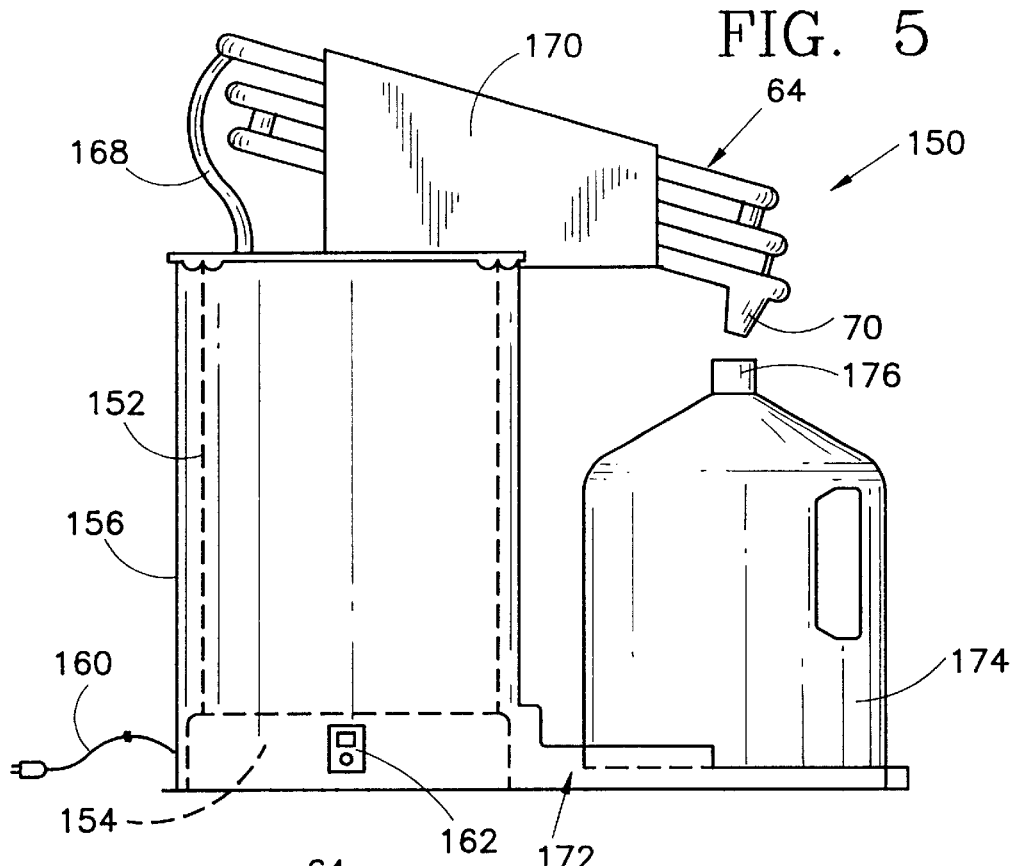
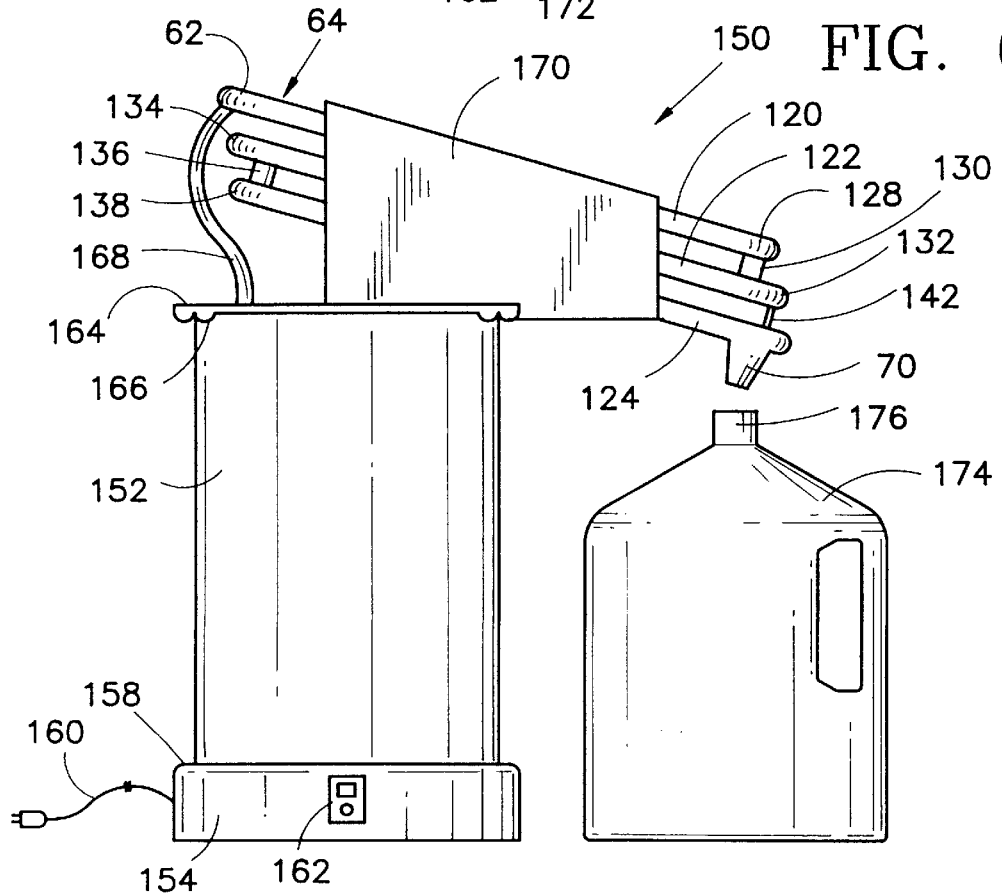

DISTILLATION APPARATUS

BACKGROUND OF THE INVENTION

The present invention relates, in general, to a distillation device for purification of water, and more particularly to a compact, continuous flow distiller for supplying pure drinking water.

The global need for sources of safe, potable water is commonly recognized, particularly in areas where health problems resulting from unsanitary water conditions is apparent. One such high risk area is found in regions where hazardous waste materials have been dumped with resulting runoff into water supplies. Another high risk area is in high population density regions or in hospitals where various diseases may be found in high concentrations. Current water supplies thus are subject to contamination from many sources, and water pollution has reached alarming rates in many areas.

Numerous attempts have been made to provide potable water, but most use filtration systems that have the serious disadvantage of creating bacterial breeding grounds. Water distillers have been provided in an attempt to overcome this problem, but such devices usually utilize condensers and fan assemblies which are disposed on top of a boiler vessel, with the cooling effect of the condenser being negatively impacted by the radiant heat from the boiling water in the vessel and from the heat source. Furthermore, most water distillers use at least some plastic or other less durable materials that negate the precision of the device and have a negative effect on the purity of the distillation process. Heat and steam react with plastic and other less durable materials, adding bad odor, taste and chemicals to the distilled water.

Most water distillers are noisy because they have an electric fan to move ambient air in order to enhance heat exchange in the condenser. Some water distillers have attempted to overcome this by using cooling water to enhance heat exchange, but this creates waste water. Further, the use of an electric fan or cooling water to enhance heat exchange is a waste of natural resources.

Furthermore, prior art water distillers are difficult to maintain in good operating condition because of the difficulties encountered in cleaning sediment and scale from the interior of the distiller. Most water distillers require a substantial amount of disassembly involving multiple parts in order to fully clean the boiler. In many cases, the user will not realize the difficulty of this job until the water distiller fails to produce water up to its rated capacity.

Numerous attempts have been made to facilitate the descaling and cleaning of distillers, but such attempts have not completely solved the problems in the prior art. In most cases, such attempts have resulted only in additional components, requiring additional maintenance and increasing the cost of the unit. Thus, the maintenance of these prior devices is an acknowledged disadvantage.

To avoid the need to disassemble a distiller, many attempts have been made to address the cleaning problem by the use of after market chemicals for removing scale. However, this has not completely eliminated the difficult manual cleaning and maintenance of distiller components. Furthermore, the use of chemicals for this purpose is a waste of natural resources and ultimately adds to the already-serious pollution problems.

Other attempts to solve the cleaning problem have included installation of additional electrical circuitry and sensors to periodically raise the temperature of a heating element when it is not submerged in water. This is done in an attempt to break away accumulated scale, but has not eliminated the difficult manual cleaning and maintenance problem. Furthermore, in all probability, the raising of the temperature high enough to break the scale in this manner will damage the element and other materials around it because of excess heat.

Another problem found in the prior art devices is that of distillate retention in condensers which serves to increase the heat in the condenser and retards heat exchange.

SUMMARY OF THE INVENTION

It is a primary object of the present invention to address environmental and public health concerns regarding the provision of safe drinking water in an effective manner.

It is a further object of the invention to provide a simple, durable, high quality, cost-effective, precision water distiller that produces ultra-pure water.

It is another object of the invention to provide an improved water distiller which is so constructed as to protect the condenser from being negatively affected by radiant heat from boiling water in the vessel or from the distiller heat source.

It is another object of the invention to provide a precision water distiller wherein vapor, steam or condensate does not come into contact with less durable materials such as plastic, to provide a distiller that operates quietly by eliminating the need for an electric fan for the condenser, and to provide a design where an ambient air flow cools the condenser by convection.

It is another object of the invention to provide a water distiller which eliminates the need for filters while still assuring purity and reliable performance.

A still further object of the invention is to provide a removable boiler in a distiller, wherein the boiler is seated within a housing in such a way that the vessel can be easily removed for cleaning or replacement.

It is a still further object of the invention to provide a protective control for a distiller which prevents overheating and boiling away of all of the water in the boiler to prevent scale and accumulation of sediment.

A still further object of the invention is to provide a water distiller that is adaptable to a variety of different heat sources including electric, gas and wood, and which is adaptable to numerous different applications such as for a continuous water supply or for a portable batch process distiller.

A still further object of the invention is to provide a water distiller with fewer parts and with a resulting lower manufacturing and assembly cost to reduce the use of natural resources and to provide a lower consumer price to increase the availability of the product.

A still further object of the invention is to provide a water distiller which incorporates a runoff surface on the interior of its condenser to eliminate distillate retention and to thereby improve the heat transfer characteristics of the condenser.

Another object of the invention is to provide a water distiller that requires no filters or chemicals.

It is another object of the invention to provide a water distiller that is not only functional, but is aesthetically pleasing.

Briefly, the present invention is directed, in its preferred embodiments, to a water distillation system which is durable, simple, is of high quality, and which is cost effective. In one embodiment, a continuous-flow distiller for permanent placement is a free standing unit which may be mounted on or within a counter or mounted on a wall in any desired location. Such a device provides a continuous supply of clean, pure water in manufacturing facilities or in any location where pollutants may affect a water supply, and in some applications may serve as a drinking fountain.

The distiller of the invention alternatively may be fabricated as a portable unit, usually of smaller size than the continuous flow distiller, and adapted for batch processing of a desired quantity of water. In either case, the distiller includes a primary heating vessel, or boiler which receives the water which is to be treated, and a heater which may use gas, electricity, wood or the like as its fuel. The water in the heating vessel is boiled by the heater and the resulting steam is directed into, and through, a sloped condenser which incorporates a large number of passageways. These passageways provide heat exchange surfaces to allow the steam to give off its heat through the condenser walls, thereby causing the steam to return to its water form. The lowermost end of the condenser includes a drain opening which directs the distilled water into a storage container which may, in one embodiment, be a stationary tank for use, for example, in a water fountain. A pump may be provided to deliver water from this tank to any desired source. In another embodiment of the invention, the output from the condenser can be delivered to a bottle or other portable carrier for water so that the distiller does not require a large storage vessel.

In the case of a permanently installed, storage-type distiller, the components are located within a housing having a hinged access lid at the top. The boiler is supported in the housing, as by suitable angle brackets or other supports, and may be in the form of an open pot of stainless steel. The open top of this boiler is closed and sealed by the housing lid, with an outlet steam port in the lid being connected by way of a suitable pipeline to the inlet of a condenser. Water to be distilled is supplied to the boiler by way of an inlet pipe which also passes through the hinged lid.

The outlet steam port and pipeline leads steam from the boiler to the inlet of the condenser which, in accordance with the present invention, is located below the boiler and below the boiler heat source. The condenser includes multiple passageways which slope downwardly from the steam inlet to a distillate drain, or outlet, at the lowermost end of the condenser passageways.

A large enclosed container, or storage vessel, is located below the condenser and receives water from the drain terminal for storage and subsequent distribution through a suitable outlet such as a spigot which may be located at any desired position on the housing. If the spigot is located above the storage vessel, a pump may be provided to deliver water to it.

The heating unit for the boiler preferably is located immediately below the bottom surface of the boiler pot for intimate contact with the boiler to provide maximum heat transfer efficiency. A suitable insulator or shield is located below the heating unit and above the condenser to prevent heat from reaching the condenser. The condenser includes a large surface area for ready cooling of the condensate by ambient air flow around the passageways.

In a second embodiment of the invention, the boiler is located within a housing having a removable lid to provide ready access to the boiler. Again, the boiler is in the form of an open-topped pot which is supported within the housing by suitable brackets for easy removal. The lid may be closed to seal the top of the boiler and a steam outlet port through the lid leads by way of a steam line to a condenser mounted above the removable lid. The condenser again includes a large number of passageways for maximum surface area and is angled downwardly away from the entry of the steam toward a lowermost drain terminal. In a preferred form of the invention, the condenser is supported so that it extends over the edge of the housing for the boiler to provide the drain terminal at a location spaced to one side of the boiler to permit delivery of condensate directly to a storage bottle. The location and spacing of the condenser passages permits a ready flow of ambient air through the condenser for cooling purposes. The heating unit for the boiler is located within the housing and below the location of the boiler to provide maximum heating efficiency of the water.

Although the invention is described as utilizing an electric heater, it will be apparent that any heat source, such as gas or wood burners, can be used with this unit. Furthermore, the efficiency of the device is improved by the provision of a runoff surface on the interior of the condenser. This runoff surface eliminates distillate retention to thereby reduce the heat within the condenser and to increase its heat transfer characteristics. The runoff surface may be created by sandblasting, scoring, etching or otherwise roughening the interior surface of the condenser or by coating it with a material to cause improved heat exchange.

Although two preferred embodiments are illustrated, it will be understood that the specific shape and dimensions of the distiller can be varied to adapt it to a wide range of applications in various industries and at any desired location. The device provides a water distiller with fewer parts and thus with lower manufacturing and assembling costs and a reduction in the use of natural resources than prior distillers. The device requires no filters or chemicals, but can be easily cleaned by simply removing the lid of the housing and lifting the boiler out for cleaning purposes. This facilitates descaling and cleaning, as well as replacement of the boiler if necessary, and provides ready access to the heater unit for adjustment or repair.

BRIEF DESCRIPTION OF THE DRAWINGS

The foregoing, and additional objects, features and advantages of the present invention will be more fully understood by reference to the following detailed description of preferred embodiments thereof, taken in conjunction with the accompanying drawings, in which:

FIG. 3 is an enlarged cross sectional view of the condenser of FIG. 1, illustrating multiple horizontally stacked condensing passageways, or chambers;

FIG. 4 is a top perspective view of the condenser of FIG. 3;

FIG. 5 is a side elevation view of a second embodiment of the invention, illustrating a portable water distiller;

FIG. 6 is a side elevation view of the distiller of FIG. 5 with the exterior housing removed;

DESCRIPTION OF PREFERRED EMBODIMENTS

Figure 1:
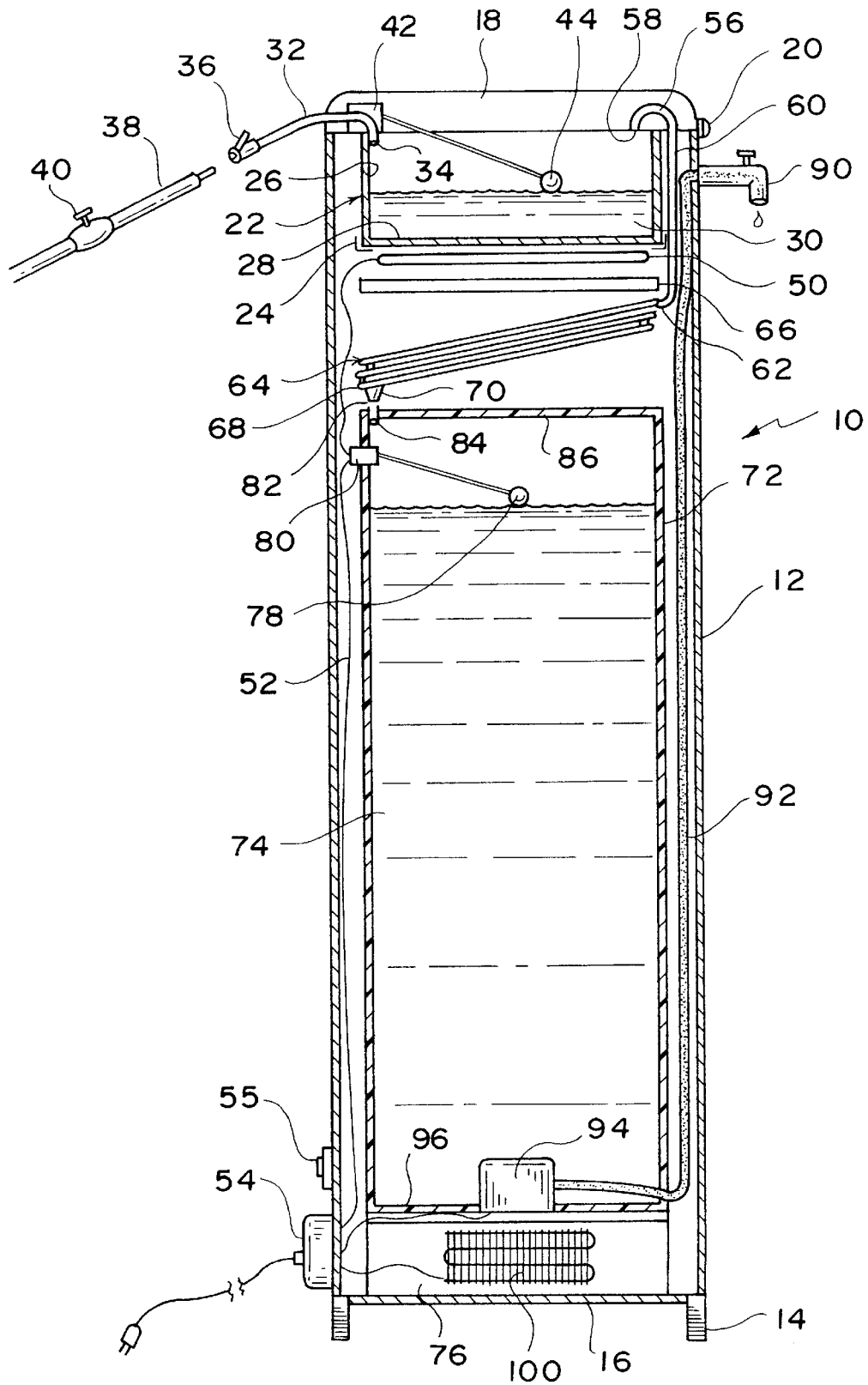
FIG. 1 is a cross sectional view of a first embodiment of the present invention, illustrating the components of a continuous mode distiller.

Turning now to a more detailed consideration of the present invention, there is illustrated in FIG. 1 a continuous mode water distiller generally indicated at 10. The distiller includes a housing 12 which may be generally cylindrical, if desired, and which preferably is constructed of metal or a durable plastic material. The housing 12 is supported by a stand 14 and is closed at its bottom by a bottom wall 16 and at its top by a hinged lid 18. The lid preferably is secured to the top edge of housing 12 by one or more hinges 20 and may be opened by pivoting it upwardly and toward the right, as viewed in FIG. 1, to provide access to the interior components of the distiller 10.

The distiller incorporates a removable boiler pot or vessel 22 which is supported within the housing by suitable brackets 24, for example. These brackets are secured to the interior of housing 12 and provide a seat for receiving vessel 22 and holding it securely in place within the housing. The vessel 22 incorporates, for example, a cylindrical side wall 26 and a flat circular bottom wall 28 for receiving water 30 which is to be distilled. The vessel supports 24 are so located as to position the vessel with its open top edge engageable by lid 18 so that when the lid is closed, the vessel 22 is closed and sealed to prevent the escape of steam during the distillation process.

Water is supplied to vessel 22 by way of a feed line 32 which extends through lid 18 and terminates above the interior of vessel 22 at a nozzle 34. The feed line is connectable by way of a quick connect junction 36 to a water supply line 38 regulated by a valve 40. The level of water in the vessel 22 is regulated by a controller 42 operated by a float 44, the float serving to sense the water level, and the controller 42 serving to regulate the flow of water into the vessel 22 by way of a conventional valve at nozzle 34.

A heat source 50 such as an electric heater is disposed within housing 12 immediately below the vessel 22 and may, if desired, provide additional support for the vessel to ensure close contact between the top surface of the heater and the bottom of vessel 22. The heater is connected, in the illustrated embodiment, by way of an electrical cord 52 through an electrical control box 54 to a suitable source of power (not shown). The control box 54 may include an on-off control switch 55, a thermostat, circuit breakers, and related electrical controls for the heater. It will be understood that, if desired, other heating sources such as a gas burner can be used, if desired, in which case a suitable gas supply line gas flow controllers and an igniter will be provided.

Also included in lid 18 is an outlet steam port 56 which has an inlet end 58 positioned above the boiler 22 when the lid is closed for conveying steam from the boiler through a steam tube 60 to the inlet end 62 of a condenser 64. An insulating layer 66 is located between the heater 50 and condenser 64 and is supported within housing 12, as by suitable brackets (not shown). The location of heater unit 50 above the condenser and the use of insulating material 66 prevent heat from the heating unit 50 from reaching the condenser, thereby increasing condenser efficiency.

Condenser 64 includes an outlet end 68 which incorporates a distillate drain terminal 70 which directs distilled water into a collection or storage container 72 supported within housing 12. Container 72 receives and stores the distilled water 74 from condenser 64 and is supported within housing 12 by a suitable base 76. The water storage container 72 may be of stainless steel or any other suitable material and incorporates a level control float 78 connected to a heater control switch 80 for switching the heater unit on and off in response to the water level in the container. Switch 80 is connected in series in line 52 for this purpose, and enables the distiller to automatically switch on when the water level in the storage container falls below a set level.

The distillate drain terminal 70 is spaced slightly above an inlet 84 in the top wall 86 of collection container 72, the spacing between drain 70 and inlet 84 serving as a gas vent for the system to provide equalization of pressure in the condenser and in the collection container.

Water in the collection container is delivered to a suitable outlet spigot 90 which may be connected by way of water line 92 to a pump 94 located, for example, in a suitable housing mounted on the bottom wall 96 of the container 72. It will be understood that in the alternative, the pump 94 can be mounted on the top wall 86 of the container with a suction line extending into the interior of the container or, if desired, the spigot 90 can be mounted directly into the sidewall of the container near the bottom thereof.

If desired, a cooling system 100 may be disposed within base 76 below the water container 72 for cooling water in the collection container, in known manner.

Figure 2:
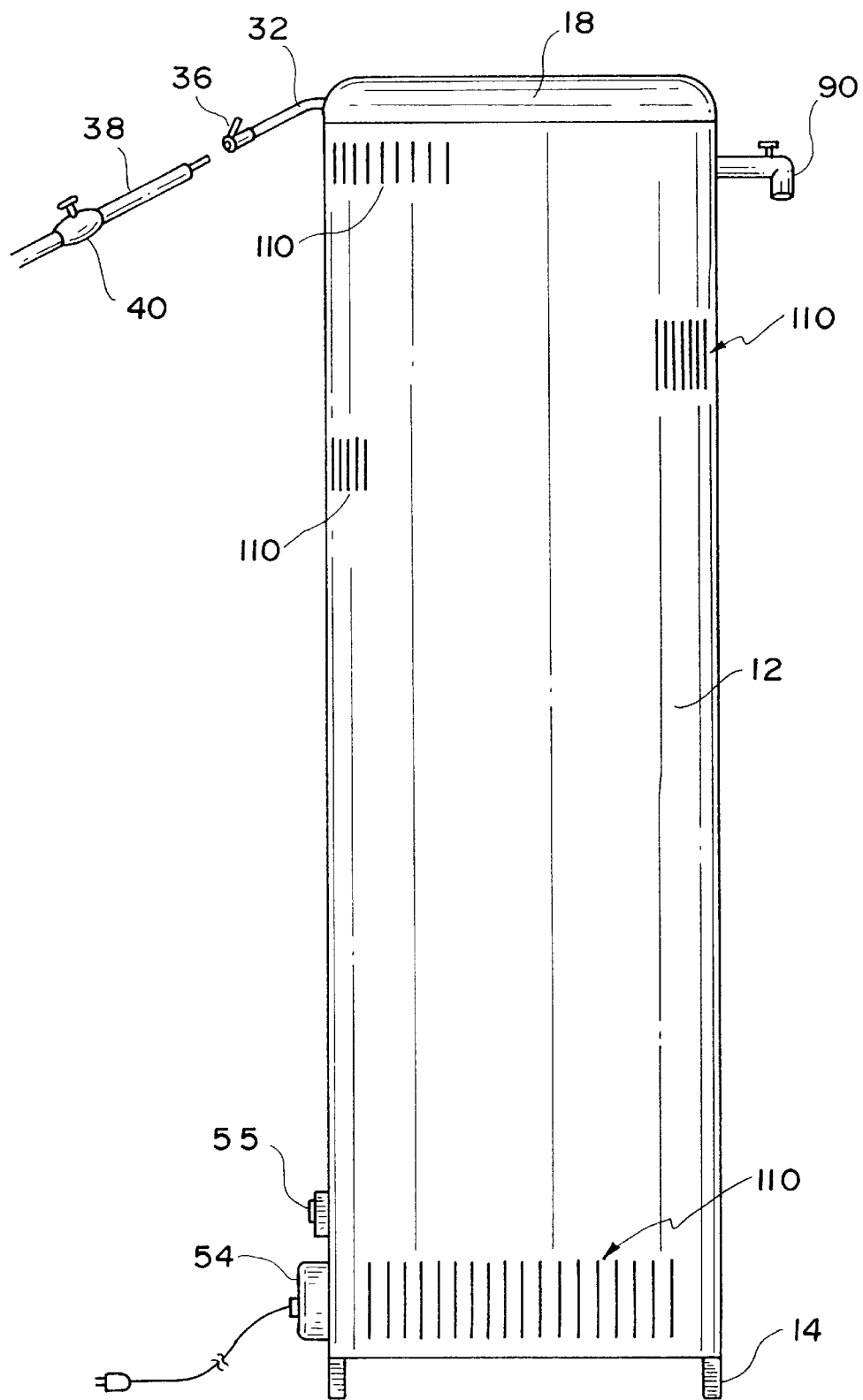
FIG. 2 is a side elevation view of the distiller of FIG. 1.

As best illustrated in FIG. 2, a number of air inlet and outlet vents 110 are provided in housing 12 to permit a free flow of air through the water cooler 100 and through the condenser 64, with the air flow passing upwardly through the housing and out exit vents located above condenser 64.

FIG. 3 is an enlarged cross sectional view of one embodiment of a condenser usable in the continuous mode system of FIG. 1. The condenser 64 includes an inlet end 62 which receives steam from steam line 60 to produce a flow of steam through a series of condenser passageways 120, 122, and 124, the steam flowing generally in the direction indicated by arrows 126. Passageway 120 receives steam at its inlet end 62 and carries the steam downwardly to an outlet end 128 where it is connected by way of a connector line 130 to the inlet end 132 of passageway 122. The steam thereafter flows upwardly through passageway 122 toward its outlet end 134 which is connected by way of a connector line 136 to the inlet end 138 of passageway 124. The steam then flows toward the outlet end 68 of condenser 64. By the time the steam reaches the outlet end 68, it will have been condensed into water, indicated by droplets 140 which are directed out of the drain terminal 70 and into the container 72, as discussed above with respect to FIG. 1. It will be noted that the inlet end 132 of passageway 122 is connected by way of a drain line 142 to the drain terminal 70 so that distillate which collects in passageways 120 and 122 can flow to the terminal 70.

Although the passageways 120, 122, and 124 illustrated in FIG. 3 may take any number of shapes and sizes, and may be representative of a multiplicity of parallel passageways, in one embodiment of the invention, illustrated in FIG. 4, each of these passageways is generally oval in shape as viewed in top plan view, to provide a wide and elongated surface area for cooling the steam from boiler 22. The downwardly sloping surfaces of the condenser passageways 120, 122, and 124 facilitate the flow of condensed water or distillate to the collection ends 128, 132 and 68 of the passageways to facilitate the collection of water in the drain terminal 70. The counterflow of steam and distillate in passage 122 facilitates the condensing process so that the steam is effectively and completely converted to water at the outlet end 68.

FIGS. 5 and 6 illustrate an alternate embodiment of the present invention, illustrating a batch-type water distiller 150 instead of the continuous mode device of FIGS. 1–4. In this embodiment, a removable boiler 152 is mounted on a suitable base 154 and is located within a housing 156. The base 154 incorporates an annular seat 158 which removably receives vessel 152 so that it can be easily removed for cleaning. The base 154 incorporates a heating unit such as the electrical heater 50 of the device of FIG. 1 which is connected to a suitable source of power by way of power line 160. A suitable on-off switch 162 may be provided. The heater unit may also include suitable thermostatic controls for maintaining the temperature of the heater at the desired level.

Container 152 may be of stainless steel or other suitable material and receives a quantity of water which is to be boiled by the heating unit contained in base 154. A lid 164 with a lock mechanism 166 to secure it in place encloses the top of container 152. An outlet steam line 168 passes through the lid 164 to the interior of container 152 and when the water in the container boils, the resulting steam is directed by way of line 168 to the inlet end 62 of a condenser which, in the illustrated embodiment, is the condenser 64 illustrated in FIG. 3, with common elements being similarly numbered. In this embodiment, the condenser 64 is secured on lid 164 by a housing 170, which may be in the form of sidewalls or plates secured to the side edges of the condenser passageways.

As illustrated in FIG. 5, the housing 156 may include a tray portion 172 for receiving a distillate container 174 having a mouth 176 aligned with the drain terminal 70 for receiving distillate from the condenser.

In a preferred form of this embodiment of the invention, condenser 64 is permanently attached to lid 164 by means of the steam line 168 and the condenser housing 170. In operation, vapor from boiling water in the boiler vessel 152 is conveyed through a steam port in the lid 164 and through the tube 168 to the inlet end of condenser 64. The stacked passageways 120, 122 and 124, described with respect to FIG. 3, condense the steam into distilled water which is directed out of the condenser by drain terminal 70 for reception by the distillate container 174.

Figure 7:
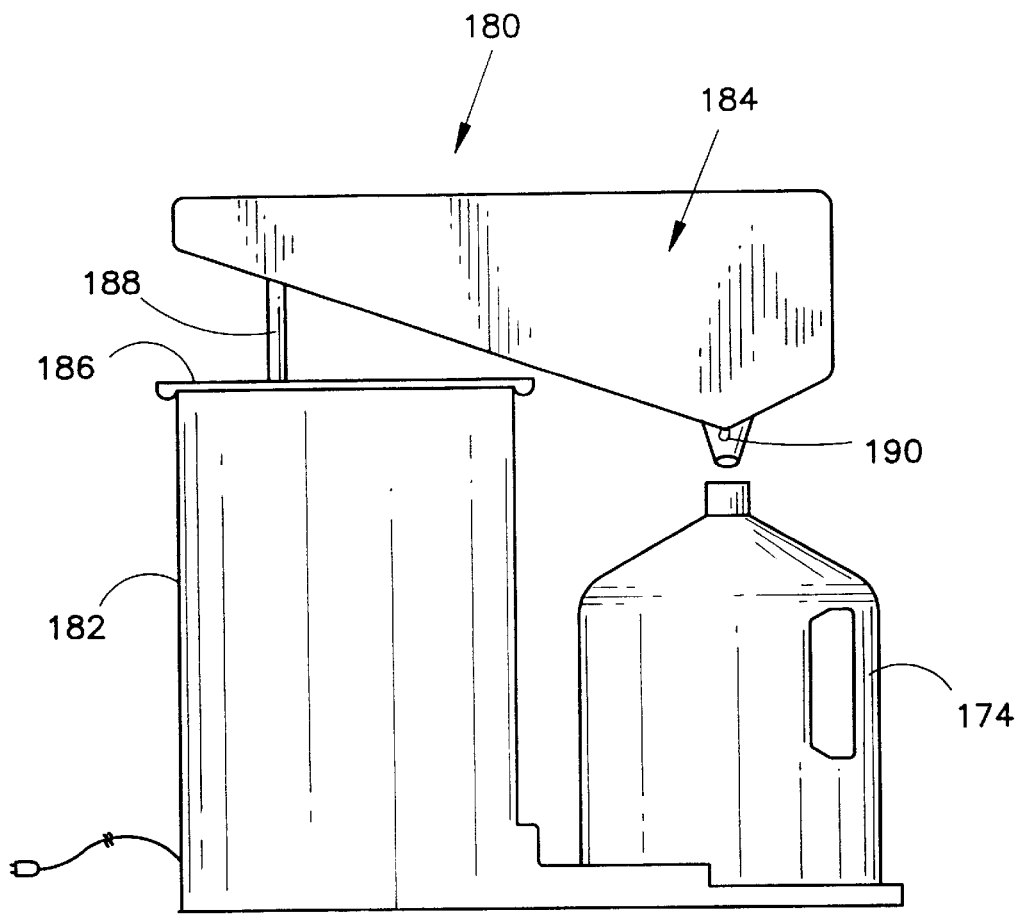
FIG. 7 is a side elevation view of a modification of the portable distiller of FIG. 5, illustrating a condenser utilizing vertical plates.

FIG. 7 illustrates a third embodiment of the present invention wherein a batch unit 180, which is similar to unit 150 illustrated in FIG. 5, incorporates a housing 182 which is similar to the housing 156 of FIG. 5. The unit 180 differs primarily in the provision of a vertical chamber condenser 184 which is mounted on a lid of 186 of a boiler contained within housing 182. The boiler (not shown) is similar to the boiler 152 illustrated in FIGS. 5 and 6, with the lid 186 closing the boiler and the top of housing 182. A steam tube 188 is secured at its lower end to lid 186, with the interior tube communicating with the interior of the boiler through lid 186. The upper end of the tube 188 is connected to, and supports, condenser 184 in a cantilever fashion, with the outlet end of the condenser terminating in a distillate outlet 190 which directs distilled water into a container 174.

Figure 8:
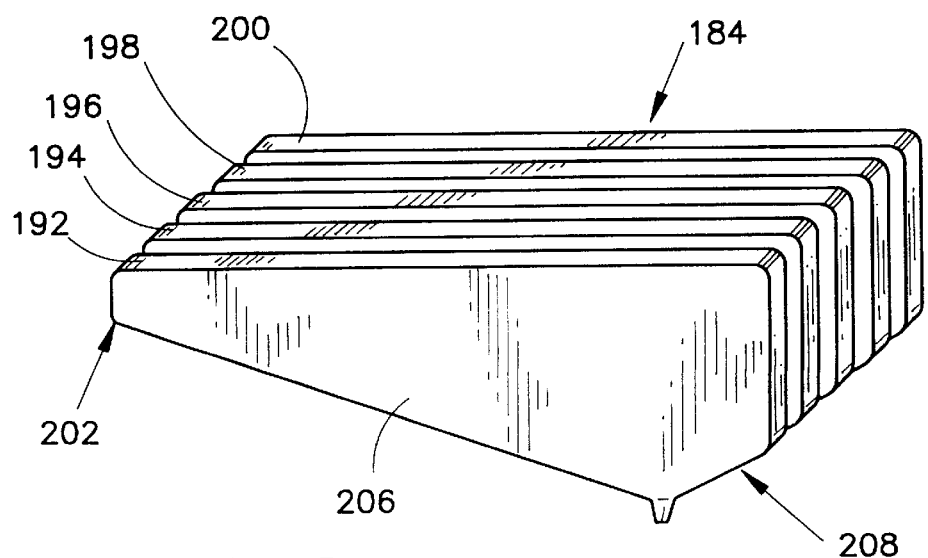
FIG. 8 is a perspective view of the condenser of FIG. 7.
Figure 10:
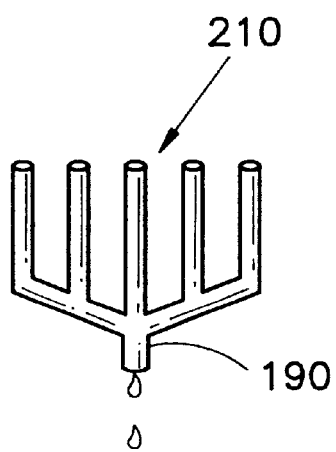
FIG. 10 is a front elevation view of a distillate manifold used with the condenser of FIG. 8.

The vertical plate condenser 184 is illustrated in a perspective view in FIG. 8 as incorporating a multiplicity of vertical passageways 192, 194, 196, 198 and 200, these plates being hollow and connected at their upper ends 202 through a suitable manifold 204 to the steam line 188. The inlet manifold 204 secures the upper ends 202 together in parallel, spaced relationship and distributes the steam to all of the vertical plate chambers. Steam is distributed within the chambers and contacts the wall surfaces, such as the outer wall surface 206 illustrated in FIG. 8, for cooling, converting the steam to water which flows down the sidewalls and downwardly along the bottom walls of each chamber toward the outlet 190. The lower ends 208 of the chambers are connected to a collection manifold 210 illustrated in FIG. 10 which interconnect the lowermost ends to outlet 190.

In an alternative form of the invention, the plate chambers 192, 194, 196, 198 and 200 may be interconnected by means of stub connectors such as those illustrated at 130 and 136 in FIG. 3 to provide a serpentine path for steam through the several chambers. In this embodiment, the inlet steam line 188 may be connected to a single one of the chambers, such as chamber 196, at the upper end thereof, with the opposite end of the chamber being connected by interconnecting lines to chambers 194 and 198. These latter chambers would then be connected at their upper ends to chambers 192 and 200, respectively, so that the steam flow is from the left hand end of condenser 184 (as viewed in FIG. 8) toward to right hand end, then outwardly to the chambers 194 and 198. The steam would then flow back toward the left hand end of the condenser and would flow outwardly again to chambers 192 and 200, with water being collected from the lowermost ends of each of the chambers by the manifold 210. It will be noted that the outlet manifold 210 may also be used at the inlet ends of the chambers for connection to steam line 188, if desired.

Figure 9:
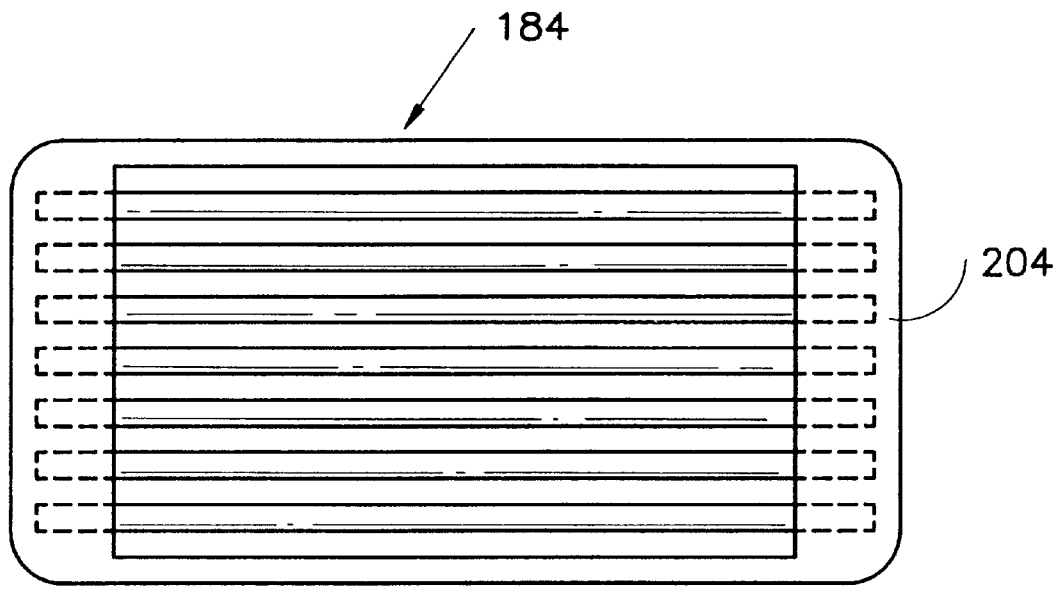
FIG. 9 is a top plan view of the condenser of FIG. 8.

The top plan view of FIG. 9 illustrates a larger number of chambers than are illustrated in FIG. 8, thus illustrating that any desired number of vertical plate chambers can be used in the distiller of the present invention. Such an enlarged condenser increases the contact between steam and ambient air to enhance the condensation of the steam for production of distilled water. The number of plates and chambers required for this arrangement is determined by plate size, material and configuration.

Figure 11:
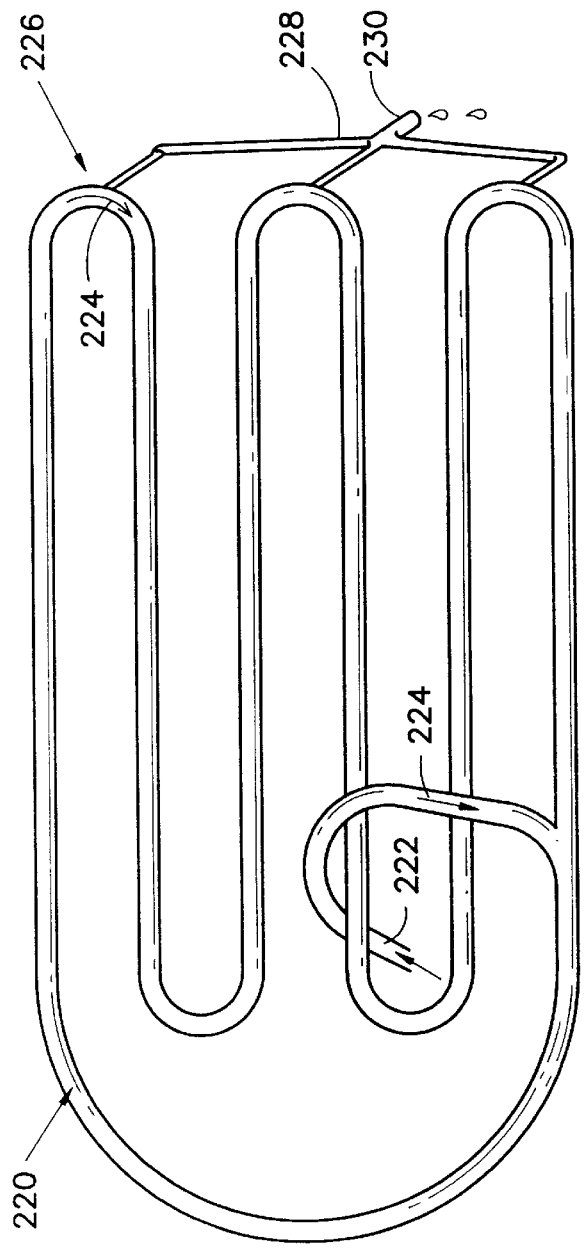
FIG. 11 is a perspective diagrammatic view of another embodiment of a condenser usable with either the continuous mode distiller of FIG. 1 or the portable mode distiller of FIG. 5.
Figure 12:
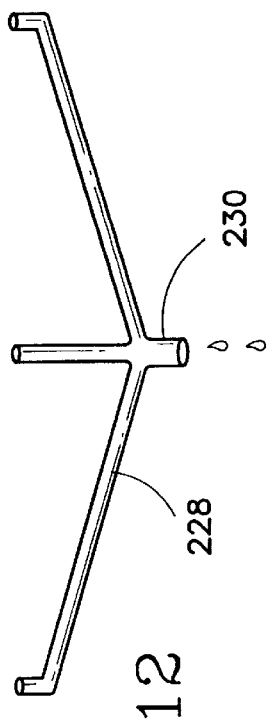
FIG. 12 is a front elevation of a tube distillate manifold for the condenser of FIG. 11.

FIG. 11 is a perspective view of another embodiment of the present invention incorporating a circulating tube condenser generally indicated at 220. In this embodiment, steam is conveyed from the unit illustrated in either FIG. 5 or FIG. 7 through a steam line such as line 188 to condenser inlet 222. The steam enters the circulating tube condenser and travels in a serpentine path as indicated by arrows 224 and is recirculated through the condenser as required to convert all of the steam to water. The water is collected at the lower ends 226 of the condenser by a manifold 228 and water is delivered by way of outlet 230 to a suitable storage container. The condenser tube may be a finned tube, may be fluted, and may be made of metal or other suitable material to enhance heat transfer. The condenser 220 may incorporate a housing (not shown) to direct the flow of ambient air by convection past the tubes to enhance heat exchange. The manifold 228 is illustrated in elevation view in FIG. 12.

The inside surfaces of the various condenser chambers may be provided with enhanced liquid runoff surfaces to reduce distillate retention within the chambers and to thereby reduce heat retention and to enhance heat transfer. Such a liquid runoff surface may be a frosted or roughened surface obtained by sandblasting, etching, micro inscribing, laser inscribing or other texturizing processes, or by a suitable coating. Such a frosted surface improves liquid flow on the surfaces to cause water to travel rapidly to the condenser outlet, thereby enhancing heat transfer.

In operation, the present invention is a fully automatic water distiller that operates, in one embodiment, in a continuous mode and in another embodiment in a batch mode. The continuous mode device, which is illustrated in FIG. 1, for example, is an exceptionally simple device which is installed simply by connecting a raw water feed line to the inlet line of the device by means of a quick connect fastener and by opening a valve on the raw water line. The unit is then turned on to provide electric power from the circuit control box 54 to the heater unit 50 as raw water to be distilled flows into the boiler tank 22. When the tank is full, an automatic control switch turns off the water supply. The heat source 50 then boils the water in boiler 22 and the resulting steam is directed through exit port 58 and through steam line 60 to condenser 64 where the steam condenses into distilled water. This distilled flows by gravity into collection container 72 for storage. When the distilled water reaches a predetermined level in container 72, float switch 78 operates control 80 to break the circuit to the heat source 50. When the distilled water level in the container 72 is reduced to a predetermined level, the float signals the control 80 to close the circuit to the heat source to thereby resume boiling water in boiler 22 to produce additional distilled water. This cycle is fully automatic, with the two float switches maintaining the water level in the boiler 22 and in the distillate container 72. The compressor 100 cools the distilled water in container 72 to a desired temperature and pump 94 delivers water on demand from container 72 to spigot 90.

Lid 18 on the boiler 22 may be connected to the housing by suitable hinges, if desired, so that the housing can be opened for ready access to the boiler. The boiler can be simply lifted out of the housing to permit sediment to be removed from the container simply by washing it. The simple and easy removal of the boiler 22 is possible because the boiler is independently seated on support 24 rather than being mounted to the side wall of the housing. Thus, the vessel 22 is a totally separate and independent part. The need for cleaning the boiler is minimized because the raw water level is automatically maintained, thereby minimizing the buildup of baked-on scale and chemical deposits.

The numerous vents 110 in the housing 12 ensure an adequate flow of air through the condenser so that the steam is efficiently condensed into distilled water.

The batch mode distiller illustrated in, for example, FIG. 5 is an easily portable distiller which is durable, simple, and highly cost effective. The portable unit is simplified by permanently attaching the condenser unit to the removable lid and by providing a removable container within the housing for receiving the raw water which is to be boiled. Any reliable heat source can be used, including, but not limited to, electric, gas or wood, this versatility allowing use of the portable unit in any desired location.

As with the first-described embodiment, the operation of the portable unit is simple. Raw water is poured into the removable boiler, and the heat source brings the water to a boil. The resulting steam is directed through the steam pipe to the condenser, where the steam condenses into distilled water and is disposed by gravity into the collection container. Again, the boiler is easily removed from the housing simply by removing the lid and the attached condenser and lifting the boiler out of the housing.

Thus, it will be seen that the water distiller of the present invention provides a simple, durable, high quality and cost effective unit for producing ultra-pure water. This distiller is environmentally friendly and employs numerous advantages over the prior art. Although the invention has been described in terms of preferred embodiments, it will be understood that these are exemplary of the invention, and that numerous variations and modifications are possible. For example, the condenser can have a wide variety of other shapes and forms, and the components of the units can be connected in ways other than those shown in the drawings. Either of the illustrated distillers can be fabricated as an integral unit or from modular parts and the various elements can be used to meet different applications and requirements, as needed. In the continuous mode, the device can be used as a drinking fountain, for example, in which case a cooler for the collection container would be provided. However, the cooler can be eliminated if not needed. Although the control of the water level is illustrated as being carried out by means of floats, other water level controllers, such as photo-optic sensors can be used. The water can be delivered from the collection container to the spigot through a variety of mechanisms, and the height of the stand can be increased to facilitate the flow of distilled water from the collection container to the spigot by gravity, if desired. The distiller can be used in a wide variety of locations, such as in manufacturing facilities in the chemical, pharmaceutical, textile, food, beverage, and nuclear industries as well as in restaurants, schools, cafeterias, business offices, and the like, as may be desired. Accordingly, the scope of the present invention is limited only by the follows claims.

What is claimed is:

1. A distiller, comprising:
   a housing having an open top and including a seat;
   a heating vessel for receiving liquid to be distilled, said vessel being removably mounted on said seat in said housing and being removable through said housing open top;
   a heater within said housing and adjacent said heating vessel, said heater being operable to boil liquid in said vessel to provide steam;
   a lid for closing said housing open top and for closing and sealing said heating vessel;
   a condenser having an inlet and an outlet and located within said housing below said heating vessel;
   a collection container within said housing below said condenser;
   a passageway extending from said heating vessel to said condenser for conveying steam downwardly from said vessel to said condenser inlet, said condenser converting said steam to distillate; and
   means for conveying said distillate downwardly from said condenser outlet to said collection container.

2. The distiller of claim 1, wherein said passageway comprises a tube leading from an exit port in said lid to an inlet end of said condenser.

3. The distiller of claim 1, wherein said condenser includes a plurality of generally horizontal, stacked condensing chambers, said chambers each sloping downwardly from said condenser inlet to said condenser outlet and being interconnected to cause steam to travel in a serpentine path from said condenser inlet toward said outlet and to cause said distillate to flow by gravity through said chambers to said condenser outlet.

4. The distiller of claim 1, wherein said condenser includces a plurality of generally vertical stacked condensing chambers, wherein each chamber has a bottom wall which slopes from said condenser inlet to said condenser outlet.

5. The distiller of claim 4, wherein said condenser outlet includes an outlet manifold coupled to an outlet end of each of said vertical chambers, said manifold having an exit aperture for delivering distillate from the condenser to said container.

6. The distiller of claim 5, further including air passages between adjacent vertical chambers.

7. The distiller of claim 1, wherein said condenser comprises a plurality of circulating tubes each following a serpentine path, said tubes being interconnected at inlet ends to receive steam and interconnected at outlet ends to deliver condensate to said container, said tubes providing a closed continuous path to cause steam to flow from said inlet ends toward said outlet ends.

8. The distiller of claim 1, wherein said condenser includes an inner surface having distillate run-off enhancement means.

9. The distiller of claim 8, wherein said run-off enhancement means includes means altering characteristics of said inner surface.

10. The distiller of claim 9, wherein said run-off enhancement means includes a roughened condenser surface.

11. The distiller of claim 1, further including dispensing means connected to said container for dispensing distillate collected in the container.

12. The distiller of claim 11, wherein said housing includes inlet and outlet air vents for convective cooling of said condenser.

13. The distiller of claim 1, wherein said lid is hingedly connected to said housing and is openable to permit removal of said heating vessel.

14. The distiller of claim 1, wherein said lid includes an inlet for conveying water to said heating vessel.

15. The distiller of claim 14, further including a water level sensor in said container and control means responsive to said water level sensor for regulating said heater.

16. Distillation apparatus, comprising:
    a heating vessel having side and bottom walls and an open top for receiving liquid to be distilled;
    a heater located below and adjacent said heating vessel bottom wall, said heater being operable to boil liquid in said heating vessel to produce steam;
    a lid for closing said open top of said heating vessel;
    a condenser mounted below said heater, said condenser having an inlet and an outlet;
    a passageway extending from said heating vessel to said condenser inlet for conveying steam from said heating vessel to said condenser, said condenser converting said steam to distillate;
    a collection container mounted below said condenser; and
    means connected to said condenser outlet and to said container for conveying said distillate to said collection container.

17. The apparatus of claim 16, further including a heat insulator between said condenser and said heater.

18. The distiller of claim 16, wherein said condenser includes a plurality of generally horizontal, stacked condensing chambers, each chamber sloping downwardly from said inlet to said outlet and being interconnected to cause steam to travel in a serpentine path from said inlet toward said outlet and to cause said distillate to flow by gravity through said chambers to said outlet.

19. The distiller of claim 16, wherein said condenser includes a plurality of generally vertical stacked condensing chambers, each chamber having a bottom wall which slopes generally downwardly from said inlet toward said outlet.

20. The distiller of claim 16, wherein said condenser comprises a plurality of circulating tubes each following a serpentine path, said tubes providing a closed continuous path to cause steam to flow from said inlet toward said outlet.

21. The distiller of claim 16, wherein said condenser includes an inner surface having distillate run-off enhancement means.

22. The distiller of claim 21, wherein said runoff enhancement means includes a roughened condenser surface.

23. The distiller of claim 16, further including dispensing means connected to said container for dispensing distillate collected in said container.

24. The distiller of claim 23, wherein said dispensing means includes a pump for delivering said distillate under pressure.

25. The distiller of claim 24, further including:
    means supplying liquid to said heating vessel to maintain a quantity of liquid therein; and
    means responsive to the quantity of distillate in said container for controlling the operation of said heater to maintain a predetermined quantity of distillate in said container to provide a continuous mode of operation of said distiller.

26. The distiller of claim 16, wherein said housing contains inlet and outlet air vents for convective cooling of said condenser.

27. The distiller of claim 26, further including a level controller for regulating the amount of water in said heating vessel.

28. A water distiller including:
    a heating vessel for receiving water to be distilled;
    a housing having side walls and an open top for removably receiving said heating vessel;
    a seat in said housing for positioning said heating vessel within said housing below said open top;
    a lid for closing said open top of said housing and for sealingly closing said open top of said heating vessel, said lid being openable for access to said heating vessel and for removal of said heating vessel from said housing;
    a heater mounted below said seat and outside said heating vessel for heating water in said heating vessel;
    a water level controller for regulating the amount of water in said heating vessel;
    a condenser connected to said heating vessel through said lid; and
    a container connected to said condenser for receiving distillate.

29. The water distiller of claim 28, wherein said heating vessel, said condenser, and said container are in a vertically stacked relationship, wherein said condenser is located above said container, and said heating vessel is located above said condenser.

30. The water distiller of claim 29, further including a water supply connected to supply water to said heating vessel to provide a continuous distilling operation.

* * * * *